United States Patent
Fischer et al.

(10) Patent No.: US 6,583,253 B1
(45) Date of Patent: Jun. 24, 2003

(54) PROPENE TERPOLYMERS WITH A LOW EXTRACTABLE PORTION

(75) Inventors: David Fischer, Breunigweiler (DE); Peter John Vaughan Jones, Billingham (GB); Franz Langhauser, Ruppertsberg (DE); Wolfgang Bidell, Mutterstadt (DE); Roland Hingmann, Ladenburg (DE); Günther Schweier, Friedelsheim (DE); Bernd Lothar Marczinke, Heiligenstein (DE); Meinolf Kersting, Neustadt (DE); Ulrich Moll, St Martin (DE)

(73) Assignee: Basell Polypropylen GmbH, Mainz (DE)

( * ) Notice: Subject to any disclaimer, the term of this patent is extended or adjusted under 35 U.S.C. 154(b) by 0 days.

(21) Appl. No.: 09/701,943

(22) PCT Filed: Jun. 2, 1999

(86) PCT No.: PCT/EP99/03810

§ 371 (c)(1),
(2), (4) Date: Dec. 5, 2000

(87) PCT Pub. No.: WO99/67307

PCT Pub. Date: Dec. 29, 1999

(30) Foreign Application Priority Data

Jun. 19, 1998 (DE) .......................... 198 27 328

(51) Int. Cl.[7] .............................. C08F 210/00
(52) U.S. Cl. ............... 526/348; 526/348.2; 526/348.3; 526/348.6; 526/943; 526/160; 526/904
(58) Field of Search .................. 526/348.2, 348.4, 526/348.5, 348.6, 348.8

(56) References Cited

U.S. PATENT DOCUMENTS

| | | | |
|---|---|---|---|
| 4,161,574 A | * 7/1979 | Strametz et al. | ............. 526/159 |
| 4,304,890 A | * 12/1981 | Suzuki et al. | ................. 526/87 |
| 4,438,243 A | * 3/1984 | Kashiwa et al. | ............. 526/125 |
| 4,692,379 A | 9/1987 | Keung | |
| 6,248,829 B1 | * 6/2001 | Fischer et al. | ............... 525/191 |
| 6,268,063 B1 | * 7/2001 | Kaminaka et al. | ........... 428/500 |
| 6,388,040 B1 | * 5/2002 | Fujita et al. | ................. 526/348 |

FOREIGN PATENT DOCUMENTS

| | | |
|---|---|---|
| CA | 2142521 | 8/1995 |
| DE | 195 33337 | 3/1997 |
| EP | 668 157 | 8/1995 |
| EP | 685 498 | 12/1995 |
| EP | 803 352 | 10/1997 |
| WO | 94/28039 | 12/1994 |

OTHER PUBLICATIONS

J.Mol. Cat., 56(1989)237–247, Tsutsui et al.

* cited by examiner

*Primary Examiner*—David W. Wu
*Assistant Examiner*—Rip A Lee
(74) *Attorney, Agent, or Firm*—Keil & Weinkauf

(57) ABSTRACT

Propene terpolymers consist of from 80 to 99.5 mol % of structural units derived from propene, from 0.1 to 15 mol % of structural units derived from ethene or a $C_4$–$C_6$-1-olefin (I) and from 0.1 to 15 mol % of structural units derived from a further $C_4$–$C_{12}$-1-olefin (II) which is different from the $C_4$–$C_6$-1-olefin (I), which propene terpolymers have a proportion of regioregular '1-2'-inserted propene units corresponding to the formula (1)

$$\frac{['1-2']}{['1-2']+['2-1']+['1-3']} \quad (1)$$

of more than 0.99, have a melting point ($T_M$), determined from the DSC peak maximum, of less than 135° C. and a weight average molecular weight ($M_W$) of more than 80,000 g/mol and have a xylene-soluble proportion ($X_S$) in % by weight of the propene terpolymer which obeys the following inequality (2)

$$X_S \leq 1411.21 \exp(-0.0591\, T_M[°\text{C.}])-0.05 \quad (2).$$

11 Claims, No Drawings

PROPENE TERPOLYMERS WITH A LOW EXTRACTABLE PORTION

The present invention relates to propene terpolymers consisting of from 80 to 99.5 mol % of structural units derived from propene, from 0.1 to 15 mol % of structural units derived from ethene or a $C_4$–$C_6$-1-olefin (I) and from 0.1 to 15 mol % of structural units derived from a further $C_4$–$C_{12}$-1-olefin (II) which is different from the $C_4$–$C_6$-1-olefin (I), which propene terpolymers have a proportion of regioregular '1-2'-inserted propene units corresponding to the formula (1)

$$\frac{['1-2']}{['1-2']+['2-1']+['1-3']} \quad (1)$$

of more than 0.99, have a melting point ($T_M$), determined from the DSC peak maximum, of less than 135° C. and a weight average molecular weight ($M_W$) of more than 80,000 g/mol and have a xylene-soluble proportion ($X_S$) in % by weight of the propene terpolymer which obeys the following inequality (2)

$$X_S \leq 1411.21 \exp(-0.0591\ T_M[° C.])-0.05 \quad (2).$$

The present invention further relates to a process for preparing propene terpolymers, their use for preparing films, fibers and moldings, the films, fibers and moldings obtainable in this way and also heat-sealable coating materials obtainable therefrom.

Binary copolymers of propene with ethene or a higher 1-olefin as comonomer prepared by means of metallocene catalysts are, inter alia, very suitable as materials for heat-sealable coatings (EP-A 668 157, DE-A 19 533 337). Compared to heat-sealable coating materials prepared using conventional Ziegler-Natta catalysts, the binary copolymers of propene prepared using metallocene catalysts have a very regular comonomer incorporation independent of the degree of polymerization, which results in them having comparatively low extractables contents. At the same time, such binary copolymers of propene are, even at low melting points, less sticky than heat-sealable coating materials which are obtained using conventional Ziegler Natta catalysts, which is why the preparation of binary copolymers of propene having a relatively low melting point is possible even under industrial conditions. This is advantageous because a low melting point usually allows lower heat-sealing temperatures which enables the cycle times in the heat-sealing process to be reduced. However, even in the case of the binary copolymers of propene prepared using metallocene catalysts, the extractables content is found to increase with decreasing melting point. As a consequence, binary copolymers of propene having a relatively low melting point can be used only to a limited extent in certain applications, for example as heat-sealable coating materials in the food sector, because the extractables content is too high.

EP-A 685 498 discloses propene terpolymers which are prepared by means of metallocene catalysts in which simple metallocenes without substituents in the $\alpha$ position to the bridge of the metallocene complex are used. Such propene terpolymers have a proportion of regioirregular propene units of more than 1% [T. Tsutsui et al., J. Mol. Catalysis 56, 237 (1989)]. In addition, the proportion of extractables, for example material which can be extracted in boiling pentane, in these propene terpolymers is still rather too high for some applications.

Furthermore, DE-A 4 317 654 describes terpolymers of propene with copolymerized ethene and 1-butene, where the polymerization is carried out using a supported metallocene catalyst comprising a metallocene complex having $\alpha$ substituents which is activated by means of a mixture of two different aluminoxanes. Such terpolymers of propene likewise have extractables contents which are still capable of improvement for some applications.

It is an object of the present invention to remedy the abovementioned drawbacks and to provide terpolymers of propene whose extractables content is further reduced, which have a low melting point and a sufficiently high molecular weight for the production of films and can be used without any great changes in existing industrial processes for producing heat-sealable coating materials.

We have found that this object is achieved by the propene terpolymers defined at the outset.

We have also found a process for preparing the propene terpolymers of the invention and also their use for producing films, fibers and moldings. The present invention also extends to films, fibers and moldings and to heat-sealable coating materials comprising the propene terpolymers of the present invention.

The propene terpolymers of the present invention consist of from 80 to 99.5 mol % of structural units derived from propene, preferably from 85 to 99 mol %, in particular from 87 to 98 mol %, also from 0.1 to 15 mol % of structural units derived from ethene or a $C_4$–$C_6$-1-olefin (I), preferably from 0.5 to 13 mol %, in particular from 0.5 to 10 mol %, plus from 0.1 to 15 mol % of structural units derived from a further $C_4$–$C_{12}$-1-olefin (II) which is different from the $C_4$–$C_6$-1-olefin (I), preferably from 0.3 to 12 mol %, in particular from 0.3 to 10 mol %. The sum of the mol % is always 100.

Suitable $C_4$–$C_6$-1-olefins (I) are, for example, 1-butene, 1-pentene, 4-methyl-1-pentene or 1-hexene, with preference being given to using 1-butene, 1-pentene or 1-hexene.

Suitable $C_4$–$C_{12}$-1-olefins (II) are, in particular, 1-butene, 1-pentene, 4-methyl-1-pentene, 1-hexene, 1-heptene or 1-octene with particular preference being given to using 1-butene, 1-pentene and 1-hexene.

Particularly preferred propene terpolymers contain from 0.1 to 15 mol %, preferably from 0.1 to 10 mol %, of structural units derived from ethene, 1-pentene or 1-hexene and from 0.1 to 15 mol %, preferably from 0.1 to 8 mol %, of structural units derived from 1-butene.

The melting point ($T_M$) of the propene terpolymers of the present invention, determined from the DSC peak maximum, is less than 135° C., in particular less than 130° C.

The propene terpolymers of the present invention also have a weight average molecular weight ($M_W$) of more than 80,000 g/mol, in particular more than 150,000 g/mol. The weight average molecular weight ($M_W$) is determined by gel permeation chromatography (GPC).

Furthermore, the propene terpolymers of the present invention have a proportion of regioregular '1-2'-inserted propene units corresponding to the formula (1)

$$\frac{['1-2']}{['1-2']+['2-1']+['1-3']} \quad (1)$$

of more than 0.99. The regioregular '1-2'-insertion of propene, the regioirregular '2-1'-insertion and the likewise regioirregular '1-3'-insertion are known, for example, from P. Pino et al., Angew. Chemie 92, 869 (1980) or from A. Zambelli et al., Macromolecules 21, 617 (1988).

The determination of the respective proportions of the regioregular '1-2'-insertion, the regioirregular '2-1'-insertion and the regioirregular '1-3'-insertion is carried out, for example, by $^{13}$C-NMR spectroscopy as described in A. Zambelli et al., Macromolecules 21, 617 (1988).

The amount of xylene-soluble material ($X_S$) in the propene terpolymer of the present invention, in percent by weight, obeys the following inequality (2)

$$X_S \leq 1411.21 \exp(-0.591 \, T_M[°C.]) - 0.05 \tag{2}$$

where $T_M$ is the melting point of the propene terpolymer in ° C.

In addition, preferred propene terpolymers of the present invention have a polydispersity ($M_w/M_n$) of less than 2.25, especially less than 2.1 and in particular less than 2.0. The determination of the polydispersity ($M_w/M_n$) is preferably carried out by means of gel permeation chromatography using 1,2,4-trichlorobenzene as solvent.

The propene terpolymers of the present invention are preferably prepared by a likewise novel process which comprises polymerizing the comonomers in the presence of a metallocene catalyst system comprising A) an inorganic or organic support,
B) at least one metallocene complex and
C) at least one compound capable of forming metallocenium ions, where, however, component C) does not comprise two different aluminoxanes.

The metallocene catalyst system used in the likewise novel process can further comprise, in addition to the components A), B) and C), at least one organic metal compound of an alkali metal or alkaline earth metal or a metal of main group III of the Periodic Table.

The polymerization for preparing the propene terpolymers of the present invention by means of such metallocene catalyst systems is carried out at from −50 to 300° C., preferably from 0 to 150° C., and at pressures of from 0.5 to 3000 bar, preferably from 1 to 100 bar. In this likewise novel process, the residence times of the respective reaction mixtures should be set to from 0.5 to 5 hours, in particular from 0.7 to 3.5 hours. In the polymerization, it is also possible to make concomitant use of, inter alia, antistatics and molecular weight regulators, for example hydrogen.

The polymerization can be carried out in solution, in suspension, in liquid monomers or in the gas phase. The polymerization is preferably carried out in liquid monomers (bulk process) or in the gas phase, with preference being given to the stirred gas phase.

The likewise novel process can be carried out either continuously or batchwise. Suitable reactors are, inter alia, continuous stirred tank reactors or loop reactors; it is also possible, if desired, to use a plurality of stirred tank reactors or loop reactors connected in series (reactor cascade).

The metallocene catalyst systems used comprise an inorganic or organic support as component A). As inorganic support, it is possible to use an inorganic oxide which has a pH determined by the method of S. R. Morrison, "The Chemical Physics of Surfaces", Plenum Press, New York [1977], pages 130ff, of from 1 to 6 and has voids and channels whose macroscopic proportion by volume in the total particle is in the range from 5 to 30%. Particular preference is given to using inorganic oxides whose pH, i.e. the negative logarithm to the base 10 of the proton concentration, is in the range from 2 to 5.5.

As inorganic supports, particular preference is given to inorganic oxides which have a mean particle diameter of from 5 to 200 μm, in particular from 20 to 90 μm, and a mean particle diameter of the primary particles of from 0.1 to 20 μm, in particular from 0.1 to 5 μm. The primary particles here are porous, granular particles. The primary particles have pores having a diameter of, in particular, from 0.1 to 1000 Å. Furthermore, the inorganic oxides to be used have voids and channels having a mean diameter of from 0.1 to 20 μm, in particular from 1 to 15 μm. In particular, the inorganic oxides also have a pore volume of from 0.1 to 10 cm$^3$/g, preferably from 1.0 to 5.0 cm$^3$/g, and a specific surface area of from 10 to 1000 m$^2$/g, preferably from 100 to 500 m$^2$/g. Such finely divided inorganic oxides are obtainable, for example, by spray drying milled hydrogels and are also commercially available.

Preferred inorganic supports are, in particular, oxides of silicon, of aluminum, of titanium or of a metal of main group I or II of the Periodic Table. Particularly preferred inorganic oxides are aluminum oxide, magnesium oxide, sheet silicates and also silica gel (SiO$_2$).

It is also possible to use cogels, i.e. mixtures of at least two different inorganic oxides, as component A).

Furthermore, the catalyst component A) can also be an organic support, for example a thermoplastic polymer. Preferred organic supports are polymers of 1-alkenes, in particular propene homopolymers or propene copolymers, also ethene homopolymers or ethene copolymers. It is also possible to use polymers of styrene.

Preference is given to using from 0.1 to 10,000 μmol, in particular from 5 to 200 μmol, of the metallocene complex, i.e. the component B), per gram of support, i.e. the component A).

As component B), the metallocene catalyst system used comprises one or more metallocene complexes. Particularly suitable metallocene complexes are those of the formula (I)

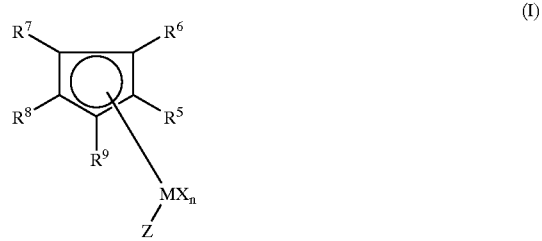

where the substituents have the following meanings:
M is titanium, zirconium, hafnium, vanadium, niobium or tantalum, or an element of transition group III of the Periodic Table and the lanthanides,
X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —OR$^{10}$ or —NR$^{10}$R$^{11}$,
n is an integer from 1 to 3, where n corresponds to the valence of M minus 2,
where
R$^{10}$ and R$^{11}$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical,
R$^5$ to R$^9$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together be a saturated or unsaturated cyclic group having from 4 to 15 carbon atoms which may in turn bear a $C_1$–$C_8$-alkyl radical, a $C_7$–$C_{20}$-arylalkyl radical or a $C_6$–$C_{10}$-aryl radical as substituent, or Si(R$^{12}$)$_3$ where $R^{12}$ is $C_1$–$C_{10}$-alkyl, $C_3$–$C_{10}$-cycloalkyl or $C_6$–$C_{15}$-aryl, Z is X or

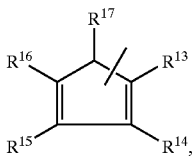

where the radicals $R^{13}$ to $R^{17}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together be a saturated or unsaturated cyclic group having from 4 to 15 carbon atoms, which may in turn bear a $C_1$–$C_8$-alkyl radical, a $C_6$–$C_{10}$-aryl radical or a $C_7$–$C_{20}$-arylalkyl radical as substituent, or $Si(R^{18})_3$ where $R^{18}$ is $C_1$–$C_{10}$-alkyl, $C_6$–$C_{15}$-aryl or $C_3$–$C_{10}$-cycloalkyl, or the radicals $R^8$ and Z together form an —$R^{19}$—A— group, where

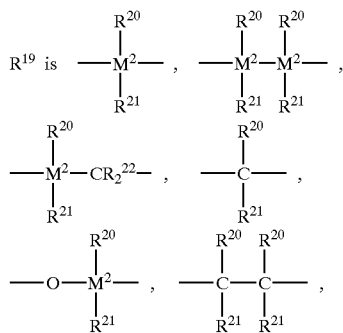

=$BR^{20}$, =$AlR^{20}$, —Ge—, —Sn—, —O—, —S—, =SO, =$SO_2$, =$NR^{20}$, =CO, =$PR^{20}$ or =$P(O)R^{20}$, where $R^{20}$, $R^{21}$ and $R^{22}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals in each case together with the atoms connecting them form a ring, and $M^2$ is silicon, germanium or tin, A is —O—, —S—,

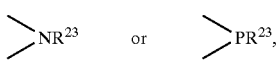

where $R^{23}$ is $C_1$–$C_{10}$-alkyl, $C_6$–$C_{15}$-aryl, $C_3$–$C_{10}$-cycloalkyl, alkylaryl or $Si(R^{24})_3$, where $R^{24}$ is hydrogen, $C_1$–$C_{10}$-alkyl, $C_6$–$C_{15}$-aryl, which may in turn bear $C_1$–$C_4$-alkyl groups as substituents or $C_3$–$C_{10}$-cycloalkyl or the radicals $R^8$ and $R^{16}$ together form an —$R^{19}$— group.

Among the metallocene complexes of the formula I, preference is given to

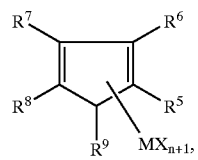

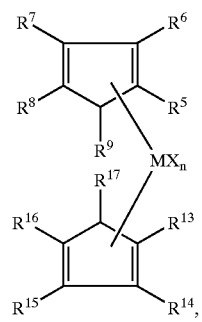

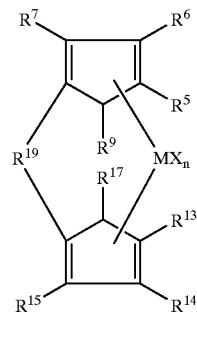

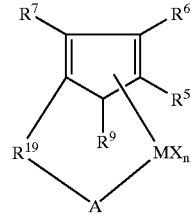

The radicals X can be identical or different, but are preferably identical.

Among the compounds of the formula Ia, particular preference is given to those in which M is titanium, zirconium or hafnium, X is chlorine, $C_1$–$C_4$-alkyl or phenyl, n is 2 and $R^5$ to $R^9$ are hydrogen or $C_1$–$C_4$-alkyl.

Among the compounds of the formula Ib, preference is given to those in which

M is titanium, zirconium or hafnium,

X is chlorine, $C_1$–$C_4$-alkyl or phenyl, n is 2, $R^5$ to $R^9$ are hydrogen, $C_1$–$C_4$-alkyl or $Si(R^{12})_3$, $R^{13}$ to $R^{17}$ are hydrogen, $C_1$–$C_4$-alkyl or $Si(R^{18})_3$.

Particularly suitable compounds of the formula Ib are those in which the cyclopentadienyl radicals are identical.

Examples of particularly suitable compounds are: bis(cyclopentadienyl)zirconium dichloride, bis(pentamethylcyclopentadienyl)zirconium dichloride, bis(methylcyclopentadienyl)zirconium dichloride, bis(ethylcyclopentadienyl)zirconium dichloride, bis(n-butylcyclopentadienyl)zirconium dichloride and bis (trimethylsilylcyclopentadienyl)zirconium dichloride and also the corresponding dimethylzirconium compounds.

Particularly suitable compounds of the formula Ic are those in which $R^5$ and $R^{13}$ are identical and are hydrogen or $C_1$–$C_{10}$-alkyl, $R^9$ and $R^{17}$ are identical and are hydrogen, methyl, ethyl, isopropyl or tert-butyl, $R^6$, $R^7$, $R^{14}$ and $R^{15}$ have the meanings $R^7$ and $R^{15}$ are $C_1$–$C_4$-alkyl, $R^6$ and $R^{14}$ are hydrogen or two adjacent radicals $R^6$ and $R^7$ or $R^{14}$ and $R^{15}$ are together a cyclic group having from 4 to 18 carbon atoms,

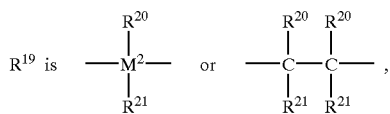

M is titanium, zirconium or hafnium and

X is chlorine, $C_1$–$C_4$-alkyl or phenyl.

Examples of particularly suitable complexes are: dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methylbenzindenyl)zirconium dichloride, dimethylsilanediylbis(2-ethylbenzindenyl)zirconium dichloride, methylphenylsilanediylbis(2-ethylbenzindenyl)zirconium dichloride, methylphenylsilanediylbis(2-methylbenzindenyl)zirconium dichloride, diphenylsilanediylbis(2-methylbenzindenyl)zirconium dichloride, diphenylsilanediylbis(2-ethylbenzindenyl)zirconium dichloride, diphenylsilanediylbis(2-methylindenyl)hafnium dichloride and also the corresponding dimethylzirconium compounds.

Further examples of suitable complexes are: dimethylsilanediylbis(2-methyl-4-phenylindenyl)zirconium dichloride, dimethylsilanediylbis(2-methyl-4-naphthylindenyl)zirconium dichloride, dimethylsilanediylbis(2-methyl-4-isopropylindenyl)zirconium dichloride, dimethylsilanediylbis(2-methyl-4,6-diisopropylindenyl)zirconium dichloride and also the corresponding dimethylzirconium compounds.

Particularly useful compounds of the formula Id are those in which

M is titanium or zirconium,

X is chlorine, $C_1$–$C_4$-alkyl or phenyl,

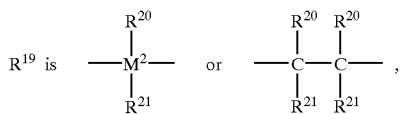

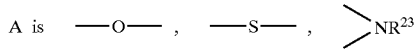

and $R^5$ to $R^7$ and $R^9$ are hydrogen, $C_1$–$C_{10}$-alkyl, $C_3$–$C_{10}$-cycloalkyl, $C_6$–$C_{15}$-aryl or $Si(R^{12})_3$ or two adjacent radicals are a cyclic group having from 4 to 12 carbon atoms.

Such complexes can be synthesized by methods known per se, with preference being given to reacting the appropriately substituted, cyclic hydrocarbon anions with halides of titanium, zirconium, hafnium, vanadium, niobium or tantalum.

Examples of appropriate preparative methods are described, inter alia, in Journal of Organometallic Chemistry, 369 (1989), 359–370.

It is also possible to use mixtures of different metallocene complexes.

As component C), the metallocene catalyst system used in the likewise novel process comprises at least one compound capable of forming metallocenium ions, but component C) does not comprise two different aluminoxanes.

Suitable compounds capable of forming metallocenium ions are strong, uncharged Lewis acids, ionic compounds containing Lewis acid cations and ionic compounds containing Brönsted acids as cation.

As strong, uncharged Lewis acids, preference is given to compounds of the formula II $$M^3X^1X^2X^3 \qquad \qquad II$$

where $M^3$ is an element of main group III of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula II in which $X^1$, $X^2$ and $X^3$ are identical, preferably tris(pentafluorophenyl)borane.

Useful ionic compounds containing Lewis acid cations are compounds of the formula III $$[(Y^{a+})Q_1Q_2 \ldots Q_z]^{d+} \qquad \qquad III$$

where

Y is an element of main groups I to VI or transition groups I to VIII of the Periodic Table, $Q_1$ to $Q_z$ are singly negatively charged groups such as $C_1$–$C_{28}$-alkyl, $C_6$–$C_{15}$-aryl, alkylaryl, arylalkyl, haloalkyl, haloaryl each having from 6 to 20 carbon atoms in the aryl part and from 1 to 28 carbon atoms in the alkyl part, $C_3$–$C_{10}$-cycloalkyl, which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6 and z is an integer from 0 to 5, and d corresponds to the difference a−z, with the proviso that d is greater than or equal to 1.

Particularly suitable Lewis acid cations are carbonium cations, oxonium cations and sulfonium cations and also cationic transition metal complexes. Particular mention may be made of the triphenylmethyl cation, the silver cation and the 1,1'-dimethylferrocenyl cation. They preferably have non coordinating counterions, in particular boron compounds as are also mentioned in WO-A 91/09882, preferably tetrakis(pentafluorophenyl)borate.

Ionic compounds containing Brönsted acids as cations and preferably likewise non coordinating counterions are mentioned in WO-A 91/09882; the preferred cation is N,N-dimethylanilinium.

The compound C) capable of forming metallocenium ions is preferably used in an amount of from 0.1 to 10 equivalents, based on the metallocene complex I.

Particularly suitable compounds C) capable of forming metallocenium ions are open-chain or cyclic aluminoxane compounds of the formula IV or V

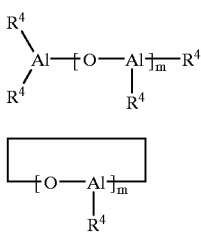

where $R^4$ is a $C_1$–$C_4$-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, for example, in EP-A 284 708 and U.S. Pat. No. 4,794,096.

In general, the oligomeric aluminoxane compounds obtained in this way are in the form of mixtures of both linear and cyclic chain molecules of different lengths, so that m should be regarded as a mean. The aluminoxane compounds can also be present in admixture with other metal alkyls, preferably aluminum alkyls.

In the metallocene catalyst system which is used in the process of the present invention, there are not two different aluminoxanes of the formula IV or V present as compound C) capable of forming metallocenium ions. For the purposes of the present invention, different aluminoxanes are aluminoxanes of the formula IV or V which have different radicals $R^4$.

Preferably, both the metallocene complexes (component B) and the compound capable of forming metallocenium ions (component C) are used in solution; particularly preferred solvents are aromatic hydrocarbons having from 6 to 20 carbon atoms, in particular xylenes and toluene.

Furthermore, it is also possible to use aryloxyaluminoxanes, as described in U.S. Pat. No. 5,391,793, aminoaluminoxanes as described in U.S. Pat. No. 5,371,260, aminoaluminoxane hydrochlorides as described in EP-A 633 264 or siloxyaluminoxanes, as described in EP-A 621 279 as component C).

It has been found to be advantageous to use the metallocene complexes and the oligomeric aluminoxane compound in such amounts that the atomic ratio of aluminum from the oligomeric aluminoxane compound to the transition metal from the metallocene complexes is in the range from 10:1 to $10^6$:1, in particular in the range from 10:1 to $10^4$:1.

The metallocene catalyst system used for preparing the propene terpolymers of the present invention may, if desired, further comprise, as component D), a metal compound of the formula VI

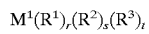            VI $$M^1(R^1)_r(R^2)_s(R^3)_t$$

where $M^1$ is an alkali metal, an alkaline earth metal or a metal of main group III of the Periodic Table, i.e. boron, aluminum, gallium, indium or thallium, $R^1$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $R^2$ and $R^3$ are hydrogen, halogen, $C_1$–$C_{10}$-alkyl, $C_6$–$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of $M^1$.

Among the metal compounds of the formula VI, preference is given to those in which $M^1$ is lithium, magnesium or aluminum and $R^1$ to $R^3$ are $C_1$–$C_{10}$-alkyl.

Particularly preferred metal compounds of the formula VI are n-butyllithium, n-butyl-n-octylmagnesium, n-butyl-n-heptylmagnesium, tri-n-hexylaluminum, triisobutylaluminum, triethylaluminum and trimethylaluminum.

If a component D) is used, it is preferably present in the catalyst system in an amount of from 800:1 to 1:1, in particular from 500:1 to 50:1 (molar ratio of $M^1$ from formula VI to transition metal M from formula I).

The components A), B), C) and, if desired, D) are used together as metallocene catalyst system.

The propene terpolymers of the present invention have a very low proportion of extractables together with a low melting point and also a sufficiently high molecular weight for the production of films. They are, inter alia, well suited to the production of heat-sealable coating materials. They are generally well suited to the production of films, fibers and moldings.

The likewise novel process in which the metallocene catalyst systems described are used is relatively simple to carry out and has a high productivity.

EXAMPLES

Example 1

Preparation of a Supported Metallocene Catalyst
a) Preparation of the Support Material 1000 g of silica gel (SG 332, particle diameter=50 μm, from Grace; baked out at 180° C. under reduced pressure (1 mbar) for 8 hours) were suspended in 5 l of toluene under a nitrogen ($N_2$) atmosphere. At 18° C., 7.75 l (6.83 kg) of 1.53 molar methylaluminoxane (MAO) solution (in toluene, from Witco) were added over a period of 120 minutes. The mixture was then stirred for another 7 hours at room temperature, filtered and the filter cake was washed twice with 2.5 l each time of toluene. The material was then dried under reduced pressure.

b) Loading With the Metallocene Complex 1 kg of the MAO-laden silica gel prepared in a) was placed in an evacuated vessel. Subsequently, a solution of 5.8 g (10 mmol) of rac-dimethylsilylenebis(2-methylbenzindenyl)zirconium dichloride in 1.32 l of 1.53 molar MAO solution (toluene) was added while stirring. After bringing the vessel to atmospheric pressure by admission of $N_2$, the mixture was stirred for 30 minutes at room temperature. The major part of the solvent was then distilled off under reduced pressure at 20° C. (until no more solvent went over). The temperature was subsequently increased in 5° C. steps to 55° C. and the catalyst was dried until it remained as an orange, free-flowing powder.

Comparative Example A

Preparation of Propene-1-butene Copolymers 20 mmol of triisobutylaluminum (TiBA; 10 ml of a 2 molar solution in heptane) were placed in a dry 10 l autoclave which had been flushed with $N_2$. After addition of 4500 g of liquid propene and about 25 g of liquid 1-butene, 697 mg of the supported metallocene catalyst prepared in Example 1 were blown in via a lock by means of $N_2$ while stirring at room temperature. The autoclave was subsequently heated to 60° C. and the mixture was polymerized for 90 minutes at this temperature. After this reaction time had elapsed, the polymerization was stopped by blowing-off the remaining propene/1-butene mixture and the product was discharged via a bottom discharge valve. 635 g of polymer powder were obtained (productivity: 911 g of copolymer/g of catalyst).

The properties of the copolymer obtained are shown in the Table below.

Comparative Example B

Preparation of Propene-1-butene Copolymers

The procedure of Comparative Example A was repeated using 659 mg of supported catalyst and 50 g of 1-butene. 515 g of polymer powder were obtained (productivity: 781 g of copolymer/g of catalyst).

The properties of the copolymer obtained are shown in the Table below.

Comparative Example C

Preparation of Propene-1-butene Copolymers

The procedure of Comparative Example A was repeated using 592 mg of supported catalyst and 100 g of 1-butene. 550 g of polymer powder were obtained (productivity: 929 g of copolymer/g of catalyst).

The properties of the copolymer obtained are shown in the Table below.

Comparative Example D

Preparation of Propene-1-butene Copolymers

The procedure of Comparative Example A was repeated using 634 mg of supported catalyst and 250 g of 1-butene. 395 g of polymer powder were obtained (productivity: 623 g of copolymer/g of catalyst).

The properties of the copolymer obtained are shown in the Table below.

Comparative Example E

Preparation of Propene-ethene Copolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont) and 3500 g of liquid propene, 1020 mg of the supported metallocene catalyst prepared in Example 1 were blown in via a lock by means of $N_2$ while stirring at room temperature. The autoclave was subsequently heated to 60° C. and polymerization was carried out for 90 minutes at this temperature. During the polymerization, 47 g/h of ethene were metered in continuously, i.e. a total of 70 g (2% by weight). After this reaction time had expired, the polymerization was stopped by blowing-off the remaining ethene/propene mixture and the product was discharged via a bottom discharge valve. 2020 g of polymer powder were obtained (productivity: 1980 g of copolymer/g of catalyst).

Stadis® 450 from DuPont is a commercially available product in the form of a mixture of toluene, isopropanol, dodecylbenzenesulfonic acid, a polyamine, a copolymer of 1-decene and $SO_2$, and also 1-decene.

The properties of the copolymer obtained are shown in the Table below.

Comparative Example F

Preparation of Propene-ethene Copolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont) and 3500 g of liquid propene, 1033 mg of the supported metallocene catalyst prepared in Example 1 were blown in via a lock by means of $N_2$ while stirring at room temperature. The autoclave was subsequently heated to 60° C. and polymerization was carried out for 90 minutes at this temperature. During the polymerization, 70 g/h of ethene were metered in continuously, i.e. a total of 105 g (3% by weight). After this reaction time had expired, the polymerization was stopped by blowing-off the remaining ethene/propene mixture and the product was discharged via a bottom discharge valve. 2280 g of polymer powder were obtained (productivity: 2207 g of copolymer/g of catalyst).

The properties of the copolymer obtained are shown in the Table below.

Comparative Example G

Preparation of Propene-ethene Copolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont) and 3500 g of liquid propene, 994 mg of the supported metallocene catalyst prepared in Example 1 were blown in via a lock by means of $N_2$ while stirring at room temperature. The autoclave was subsequently heated to 60° C. and polymerization was carried out for 90 minutes at this temperature. During the polymerization, 93 g/h of ethene were metered in continuously, i.e. a total of 140 g (4% by weight). After this reaction time had expired, the polymerization was stopped by blowing-off the remaining ethene/propene mixture and the product was discharged via a bottom discharge valve. 2230 g of polymer powder were obtained (productivity: 2243 g of copolymer/g of catalyst).

The properties of the copolymer obtained are shown in the Table below.

Comparative Example H

Preparation of Propene-ethene Copolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont) and 3500 g of liquid propene, 973 mg of the supported metallocene catalyst prepared in Example 1 were blown in via a lock by means of $N_2$ while stirring at room temperature. The autoclave was subsequently heated to 60° C. and polymerization was carried out for 90 minutes at this temperature. During the polymerization, 117 g/h of ethene were metered in continuously, i.e. a total of 175 g (5% by weight). After this reaction time had expired, the polymerization was stopped by blowing-off the remaining ethene/propene mixture and the product was discharged via a bottom discharge valve. 2180 g of polymer powder were obtained (productivity: 2240 g of copolymer/g of catalyst).

The properties of the copolymer obtained are shown in the Table below.

Example 2

Preparation According to the Present Invention of Propene-ethene-1-butene Terpolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont), 2000 g of liquid propene, 40 g of 1-butene (2% by weight) and 40 g of ethene (2% by weight) were metered in. At room temperature, 790 mg of the supported metallocene catalyst prepared in Example 1 were then blown in via a lock by means of $N_2$. The autoclave was subsequently heated to 60° C. and the mixture was polymerized for 90 minutes at this temperature. After this reaction time had expired, the polymerization was stopped by blowing-off the remaining monomer mixture and the product was discharged via a bottom discharge valve. 680 g of polymer powder were obtained (productivity: 860 g of terpolymer/g of catalyst). The proportion of regioregular '1-2'-inserted propene units in the terpolymer obtained corresponding to formula (1) is 99.28.

The properties of the terpolymer obtained are shown in the Table below.

Example 3

Preparation According to the Present Invention of Propene-ethene-1-butene Terpolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont), 2000 g of liquid propene and 40 g of 1-butene (2% by weight) were metered in. At room temperature, 815 mg of the supported metallocene catalyst prepared in Example 1 were then blown in via a lock by means of $N_2$. The autoclave was subsequently heated to 60° C. and polymerization was carried out for 90 minutes at this temperature. During the polymerization, 27 g/h of ethene were metered in continuously, i.e. a total of 40 g (2% by weight). After this reaction time had expired, the polymerization was stopped by blowing-off the remaining monomer mixture and the product was discharged via a bottom discharge valve. 1120 g of polymer powder were obtained (productivity: 1370 g of terpolymer/g of catalyst). The proportion of regioregular '1-2'-inserted propene units in the terpolymer obtained corresponding to formula (1) is 99.24.

The properties of the terpolymer obtained are shown in the Table below.

Example 4

Preparation According to the Present Invention of Propene-1-butene-1-hexene Terpolymers 20 mmol of triisobutylaluminum (TiBA, 10 ml of a 2 molar solution in heptane) were placed in a dry 10 l autoclave which had been flushed with $N_2$. After addition of 150 mg of antistatic solution (Stadis® 450, Du Pont), 2000 g of liquid propene, 40 g of 1-butene (2% by weight) and 40 g of 1-hexene (2% by weight) were metered in. At room temperature, 905 mg of the supported metallocene catalyst prepared in Example 1 were then blown in via a lock by means of $N_2$. The autoclave was subsequently heated to 60° C. and the mixture was polymerized for 90 minutes at this temperature. After this reaction time had expired, the polymerization was stopped by blowing-off the remaining monomer mixture and the product was discharged via a bottom discharge valve. 543 g of polymer powder were obtained (productivity: 600 g of terpolymer/g of catalyst). The proportion of regioregular '1-2'-inserted propene units in the terpolymer obtained corresponding to formula (1) is 99.12.

The properties of the terpolymer obtained are shown in the Table below.

Comparative Example I

Preparation of a Supported Metallocene Catalyst (Using a Method Analogous to that of DE-A 4 317 654)

a) Preparation of the Support Material 56 ml of a solution of 6.4 g of triethylaluminum in 48 ml of heptane were added dropwise at room temperature to a suspension of 20.2 g of silica gel (Grace, SG 332, particle diameter: 20–45 µm) over a period of 30 minutes. During this procedure, the temperature rose to 44° C. After stirring for 18 hours at room temperature, the material was filtered off, washed twice with 30 ml each time of pentane and subsequently dried in an oil pump vacuum until the support material was free-flowing.

b) Preparation of the Supported Metallocene Component 13.1 ml (20 mmol) of a solution of methylaluminoxane in toluene (1.53 molar, from WITCO GmbH) were added to 50 µmol of dimethylsilanediylbis(2-methylbenzo[e]indenyl) zirconium dichloride (29 mg) in 20 ml of toluene and the mixture was stirred for 15 minutes. 5 g of the support material were subsequently added and the mixture was stirred for another 30 minutes. Finally, the solvent was removed at room temperature in an oil pump vacuum over a period of 4 hours. This gave a free-flowing catalyst powder.

Comparative Example J

Preparation of a Propene-ethene-1-butene Terpolymer (Using a Method Analogous to that of DE-A 4 317 654)

50 g of polypropylene powder and 4.8 ml of triethylaluminum (1 molar solution in heptane) were placed in succession in a dry 10 l autoclave which had been flushed with nitrogen and the mixture was stirred for 15 minutes. Subsequently, 1.5 g of the supported catalyst were introduced into the autoclave in a countercurrent of nitrogen and the autoclave was closed. While stirring at 350 rpm, the autoclave was heated to 70° C. and, at the same time, the internal pressure was increased stepwise by introduction of gaseous propene to a final pressure of 28 bar. Subsequently, a gaseous mixture of propene, ethene and 1-butene was introduced at 70° C. and a pressure of 28 bar by means of a suitable ratio regulator so that the ratio of the partial pressures of propene, ethene and 1-butene was 25:1:0.65. The polymerization was carried out for 1.5 hours at 28 bar and 70° C. while stirring continually. The monomers consumed were continuously replaced during the polymerization.

After the gas-phase polymerization was complete, the autoclave was depressurized to atmospheric pressure over a period of 10 minutes and the resulting product was discharged in a stream of $N_2$. The productivity (g of terpolymer/g of catalyst) was 3970.

The properties of the terpolymer obtained are shown in the Table below.

The proportion of xylene-soluble material is given by $$X_s = \frac{g \times 500 \times 100}{G \times V}$$

$X_S$=proportion of xylene-soluble material in %
g=amount found
G=amount of product weighed out
V=volume of filtrate used
Molecular weight (weight average) $M_w$: by means of gel permeation chromatography (GPC)
Polydispersity $M_w/M_n$: by means of gel permeation chromatography (GPC)

TABLE

| | Comonomer content [mol %] | Melting point $T_M$ [° C.] | Proportion of xylene-soluble material $X_S$ [% by weight] | Weight average molecular weight $M_w$ [g/mol] | Polydispersity $M_w/M_n$ |
|---|---|---|---|---|---|
| Comp. Examples | | | | | |
| A | 0.3 [$C_4$] | 144.9 | 0.96 | 413,000 | 2.5 |
| B | 0.6 [$C_4$] | 143.2 | 0.98 | 414,000 | 2.4 |
| C | 2.0 [$C_4$] | 141.5 | 1.00 | 340,000 | 2.3 |
| D | 3.1 [$C_4$] | 134.7 | 1.50 | 455,000 | 2.3 |
| E | 0.5 [$C_2$] | 133.9 | 0.50 | 210,000 | 2.06 |
| F | 1.0 [$C_2$] | 131.5 | 0.70 | 197,000 | 2.05 |
| G | 1.6 [$C_2$] | 128.9 | 1.0 | 209,000 | 1.80 |
| H | 2.4 [$C_2$] | 122.9 | 3.4 | 192,000 | 1.80 |
| Examples acc. to the invention | | | | | |
| 2 | 2.6 [$C_2$] 0.5 [$C_4$] | 119.4 | 0.6 | 232,500 | 1.70 |
| 3 | 2.2 [$C_2$] 0.4 [$C_4$] | 122.8 | 0.5 | 247,500 | 1.70 |
| 4 | 3.5 [$C_4$] 1.1 [$C_6$] | 124.4 | 0.3 | 339,060 | 1.84 |
| Comp. Example J | 4.3% by wt. [$C_2$] 1.9% by wt. [$C_4$] | 109 | 11.0 | | |

The properties shown in this Table were determined as follows.

Comonomer content: by means of $^{13}$C-NMR

Melting point ($T_M$): by means of DSC (differential scanning calorimetry)

Proportion of xylene-soluble material:

500 ml of distilled xylene (isomer mixture) were placed in a 1 liter three-necked flask fitted with stirrer, reflux condenser and thermometer and were heated to 100° C. The polymer was introduced at this temperature and the mixture was subsequently heated to the boiling point of the xylene and refluxed for 60 minutes. Heating was then stopped, the mixture was cooled to 5° C. over a period of 20 minutes by means of a cooling bath and was then warmed to 20° C. again. This temperature was held for 30 minutes. The solid polymer was filtered off and exactly 100 ml of the filtrate were placed in a previously tared 250 ml single-neck flask. The solvent was removed from this filtrate on a rotary evaporator. The residue which remained was then dried for 2 hours at 80° C./200 torr in a vacuum drying oven. After cooling, the residue was weighed.

In the accompanying Figure, which shows the proportion of xylene-soluble material $X_S$ (% by weight) as a function of the melting point, it is demonstrated that the Examples 2, 3 and 4 according to the present invention, in contrast to the Comparative Examples A, B, C, D, E, F, G, H and J, lead to terpolymers whose proportion of xylene-soluble material $X_S$ conforms to the inequality $$X_S \leq 1411.21 \exp(-0.0591 \, T_M[° C.]) - 0.05 \quad (2),$$

i.e. the corresponding values lie below the drawn-in curve.

We claim:

1. A propene terpolymer consisting of from 80 to 99.5 mol % of structural units derived from propene, from 0.1 to 15 mol % of structural units derived from ethene or a $C_4$–$C_6$-1-olefin (I) and from 0.1 to 15 mol % of structural units derived from a further $C_4$–$C_{12}$-1-olefin (II) which is different from the $C_4$–$C_6$-1-olefin (I), which propene terpolymer has a proportion of regioregular '1-2'-inserted propene units corresponding to the formula (1)

$$\frac{['1-2']}{['1-2']+['2-1']+['1-3']} \quad (1)$$

of more than 0.99, has a melting point ($T_M$), determined from the DSC peak maximum, of less than 135° C. and a weight average molecular weight ($M_W$) of more than 80,000 g/mol and has a xylene-soluble proportion ($X_S$) in % by weight of the propene terpolymer which obeys the following inequality (2)

$$X_S \leq 1411.21 \exp(-0.0591\ T_M[°\ C.])-0.05 \quad (2).$$

2. A propene terpolymer as claimed in claim 1 which has a polydispersity ($M_w/M_n$) of less than 2.25.

3. A propene terpolymer as claimed in claim 1 comprising from 0.1 to 15 mol % of structural units derived from ethene, 1-pentene or 1-hexene and from 0.1 to 15 mol % of structural units derived from 1-butene.

4. A propene terpolymer as claimed in claim 1 comprising from 0.1 to 10 mol % of structural units derived from ethene, 1-pentene or 1-hexene and from 0.1 to 8 mol % of structural units derived from 1-butene.

5. A propene terpolymer as claimed in claim 1 which has a weight average molecular weight ($M_W$) of more than 150,000 g/mol and a polydispersity ($M_w M_n$) of less than 2.1.

6. A process for preparing propene terpolymers as claimed in claim 1, which comprises polymerizing the comonomers in the presence of a metallocene catalyst system comprising A) an inorganic or organic support, B) at least one metallocene complex and C) at least one compound capable of forming metallocenium ions, where, however, component C) does not comprise two different aluminoxanes.

7. A process as claimed in claim 6, wherein the metallocene catalyst system further comprises, in addition to the components A), B) and C), at least one organic metal compound of an alkali metal or alkaline earth metal or a metal of main group III of the Periodic Table.

8. A process as claimed in claim 6, wherein the metallocene complex used is a complex of titanium, zirconium or hafnium.

9. A film, fiber or molding comprising a propene terpolymer as claimed in claim 1 as significant component.

10. A heat-sealable coating material comprising a propene terpolymer as claimed in claim 1 as significant component.

11. A process for preparing films, fibers or moldings comprising the propene terpolymers of claim 1.

* * * * *

UNITED STATES PATENT AND TRADEMARK OFFICE
CERTIFICATE OF CORRECTION

PATENT NO.  : 6,583,253 B1
DATED       : June 24, 2003
INVENTOR(S) : Fischer et al.

It is certified that error appears in the above-identified patent and that said Letters Patent is hereby corrected as shown below:

<u>Title page,</u>
Item [73], Assignee, should be

-- [73] Assignee: Basell Polyolefine GmbH
                  Wesseling (DE) --

<u>Drawings,</u>
Add the Figure as attached hereto.

Signed and Sealed this

Seventh Day of October, 2003

JAMES E. ROGAN
*Director of the United States Patent and Trademark Office*

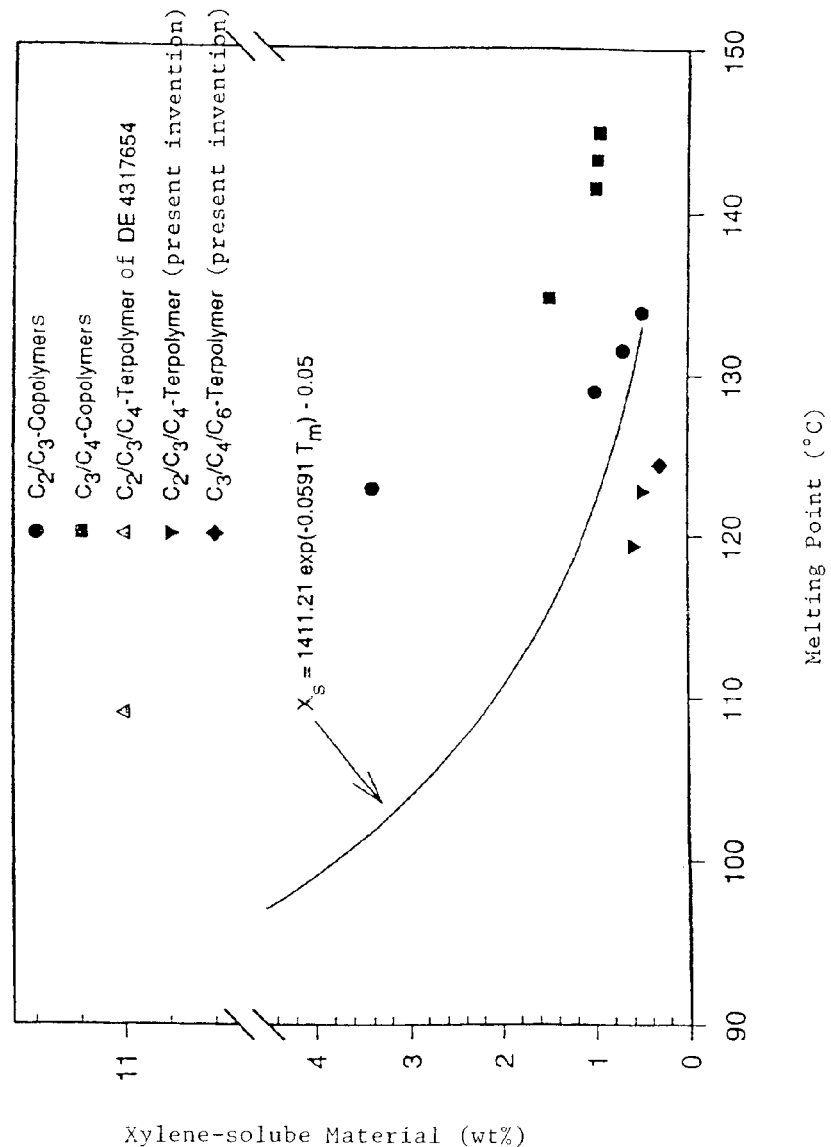
Figure